(12) United States Patent
Berglund

(10) Patent No.: US 9,533,808 B2
(45) Date of Patent: Jan. 3, 2017

(54) CABLE TIE FOR MOUNTING CABLES AGAINST A PANEL

(71) Applicant: INCO INNOVATION, Järfälla (SE)

(72) Inventor: Jan Berglund, Järfälla (SE)

(73) Assignee: One Inventor Sweden AB, Järfälla (SE)

( * ) Notice: Subject to any disclaimer, the term of this patent is extended or adjusted under 35 U.S.C. 154(b) by 0 days.

(21) Appl. No.: 14/354,999

(22) PCT Filed: Aug. 10, 2013

(86) PCT No.: PCT/SE2013/050962
§ 371 (c)(1),
(2) Date: Apr. 29, 2014

(87) PCT Pub. No.: WO2014/031063
PCT Pub. Date: Feb. 27, 2014

(65) Prior Publication Data
US 2014/0312183 A1    Oct. 23, 2014

(30) Foreign Application Priority Data

Aug. 22, 2012   (SE) ...................................... 1230082

(51) Int. Cl.
*B65D 63/10* (2006.01)
*B65D 63/00* (2006.01)
(Continued)

(52) U.S. Cl.
CPC ........... *B65D 63/1027* (2013.01); *B65D 63/00* (2013.01); *F16L 3/137* (2013.01); *F16L 3/233* (2013.01);
(Continued)

(58) Field of Classification Search
CPC ...... B65D 63/00; B65D 63/1027; F16B 15/00; F16L 3/08; F16L 3/137; F16L 3/233; E04D 3/14; G09F 3/14; H02G 3/30; H02G 3/32; H02G 3/24; Y10T 24/1498
(Continued)

(56) References Cited

U.S. PATENT DOCUMENTS 3,302,913 A * 2/1967 Collyer et al. ................. 248/73
3,473,768 A * 10/1969 Piasecki ...................... 248/68.1
(Continued)

FOREIGN PATENT DOCUMENTS

DE    2135361 A1    3/1972
DE    4332046 A1    4/1994
(Continued)

OTHER PUBLICATIONS

International Search Authority (ISA), International Search Report, PCT/SE2013/050962, Dated Nov. 22, 2013.
(Continued)

*Primary Examiner* — Nkeisha Smith
(74) *Attorney, Agent, or Firm* — Reichel Stohry LLP; Mark C. Reichel; Natalie J. Dean

(57) ABSTRACT

A cable tie with means to form a loop in order to mount cables against a panel or a marking badge. The cable tie has an integrated panel anchor having an elongated body in an area where the cable tie has an elongated cross-section and changes direction at least one time. The cable tie is intended to be mounted in a panel that has an opening with a shape that is a combination of a circular hole and a elongated opening. The mounting starts with a bending around the panel anchor which is then mounted into the openings elongated part. Then the cable tie is rotated typically 90° around the axis of the circular part of the opening. Then by releasing the bending, the band on each side of the panel (Continued)

anchor is fixed in the elongated part of the opening and the panel anchor is fixed towards the back-side of the panel.

20 Claims, 6 Drawing Sheets

(51) Int. Cl.
| | | |
|---|---|---|
| *F16L 3/233* | (2006.01) | |
| *H02G 3/30* | (2006.01) | |
| *F16L 3/137* | (2006.01) | |
| *G09F 3/14* | (2006.01) | |
| *H02G 3/32* | (2006.01) | |

(52) U.S. Cl.
CPC ........ *G09F 3/14* (2013.01); *H02G 3/30* (2013.01); *H02G 3/32* (2013.01); *H02G 3/24* (2013.01); *Y10T 24/1498* (2015.01)

(58) Field of Classification Search
USPC ........ 248/49, 68.1, 69, 71, 74.3, 73; 24/458, 24/16 PB, 17 AP; 411/400, 401
See application file for complete search history.

(56) References Cited

U.S. PATENT DOCUMENTS

| | | | | |
|---|---|---|---|---|
| 3,483,285 | A * | 12/1969 | Foley ........................... | 264/146 |
| 3,568,262 | A * | 3/1971 | Woldman .................... | 24/16 PB |
| 3,667,710 | A * | 6/1972 | Moody et al. ................. | 248/71 |
| 4,490,886 | A * | 1/1985 | Omata ......................... | 24/16 PB |
| 4,784,358 | A * | 11/1988 | Kohut ........................... | 248/74.3 |
| 4,978,091 | A * | 12/1990 | Anderson et al. ............. | 248/74.3 |
| 5,065,562 | A * | 11/1991 | Larsen et al. .................. | 52/772 |
| 5,112,013 | A * | 5/1992 | Tolbert et al. ................. | 248/74.3 |
| 5,135,188 | A * | 8/1992 | Anderson et al. ............. | 248/74.3 |
| 5,368,261 | A * | 11/1994 | Caveney et al. .............. | 248/73 |
| 5,387,250 | A * | 2/1995 | Solbeck ........................ | 24/16 PB |
| 5,713,542 | A * | 2/1998 | Benoit ........................... | 248/71 |
| 5,775,653 | A * | 7/1998 | Horney et al. ................. | 248/230.8 |
| 6,102,347 | A * | 8/2000 | Benoit ........................... | 248/230.8 |
| 6,105,908 | A * | 8/2000 | Kraus ............................ | 248/74.3 |
| 6,164,605 | A * | 12/2000 | Drake et al. .................. | 248/74.3 |
| 6,186,451 | B1 * | 2/2001 | Benoit ........................... | 248/74.3 |
| 6,209,827 | B1 * | 4/2001 | Kawai ........................... | 248/73 |
| 6,612,525 | B2 * | 9/2003 | Bagdi ............................ | 248/71 |
| 7,115,816 | B2 * | 10/2006 | Barmore ........................ | 174/135 |
| 7,185,399 | B2 * | 3/2007 | Logan ........................... | 24/16 R |
| 7,437,804 | B1 * | 10/2008 | Geiger et al. ................. | 24/16 PB |
| 7,661,634 | B2 * | 2/2010 | Thompson .................... | 248/74.3 |
| 8,459,598 | B2 * | 6/2013 | Gardner ........................ | 248/58 |
| 8,899,532 | B2 * | 12/2014 | Tanaka .......................... | 248/74.3 |
| 2007/0101551 | A1 * | 5/2007 | Thompson .................... | 24/16 PB |
| 2007/0290100 | A1 * | 12/2007 | Caveney ....................... | 248/74.3 |
| 2015/0059133 | A1 * | 3/2015 | Hirakawa et al. ............. | 24/458 |
| 2015/0097089 | A1 * | 4/2015 | Taylor et al. ................... | 248/52 |

FOREIGN PATENT DOCUMENTS

| | | |
|---|---|---|
| DE | 9317983 | 12/1994 |
| DE | 202006006324 | 8/2007 |
| EP | 0846905 A2 | 6/1998 |
| JP | 57143161 U | 9/1982 |
| JP | H11 132364 A | 5/1999 |

OTHER PUBLICATIONS

European Search Report and Supplementary European Search Report, European Patent Office, EP 13830955.4, Dated Mar. 7, 2016.

* cited by examiner

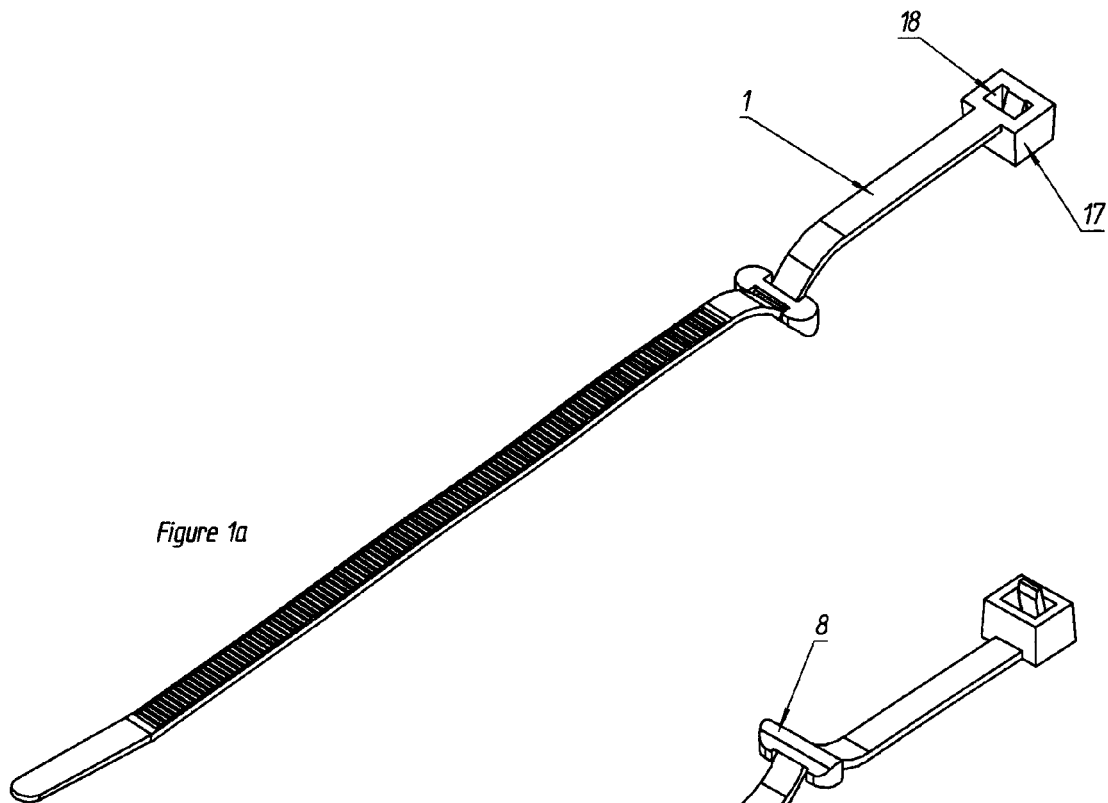
Figure 1a
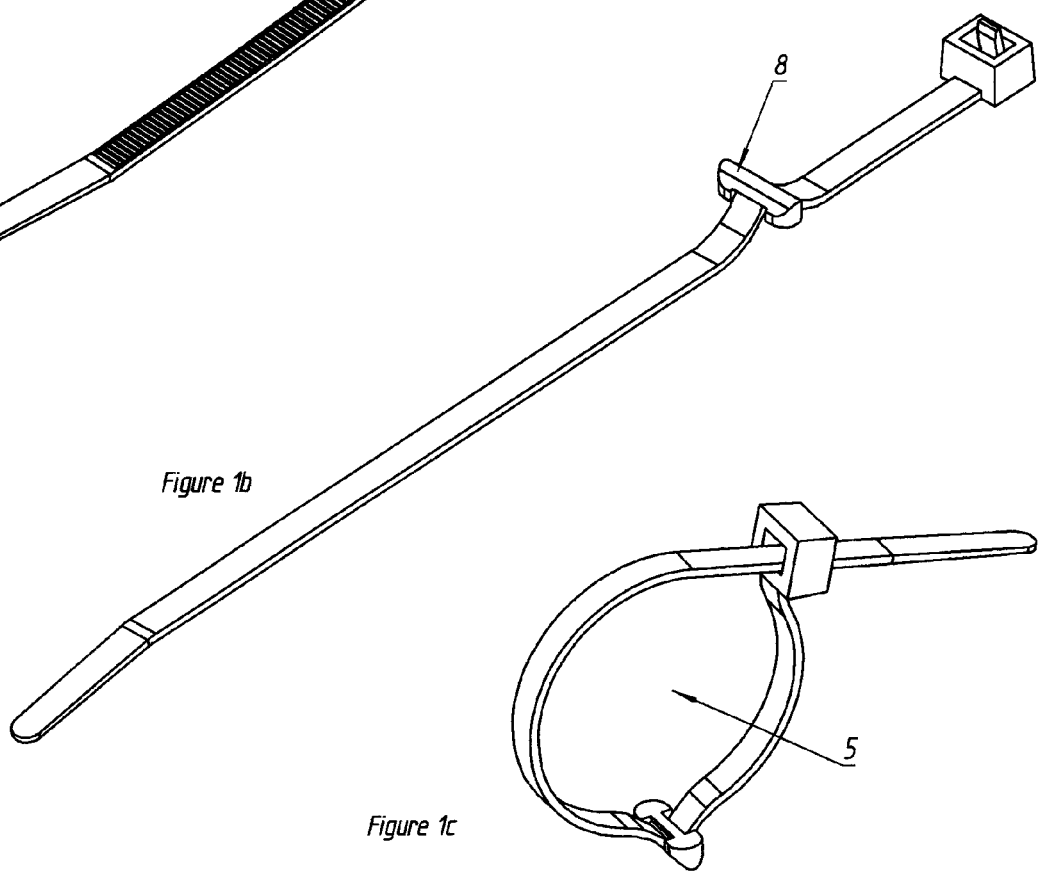
Figure 1b
Figure 1c

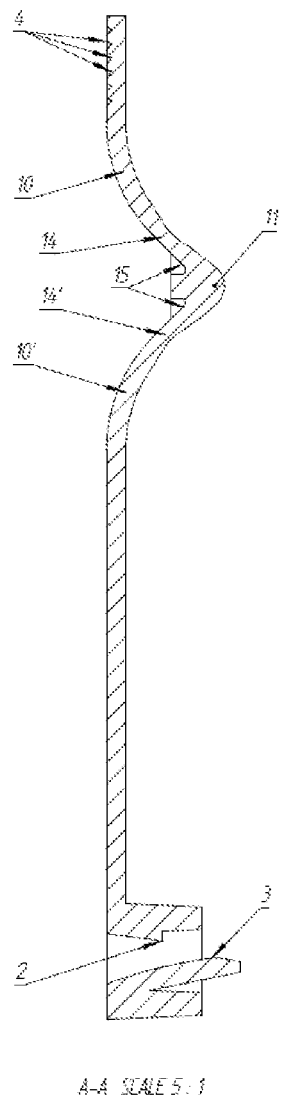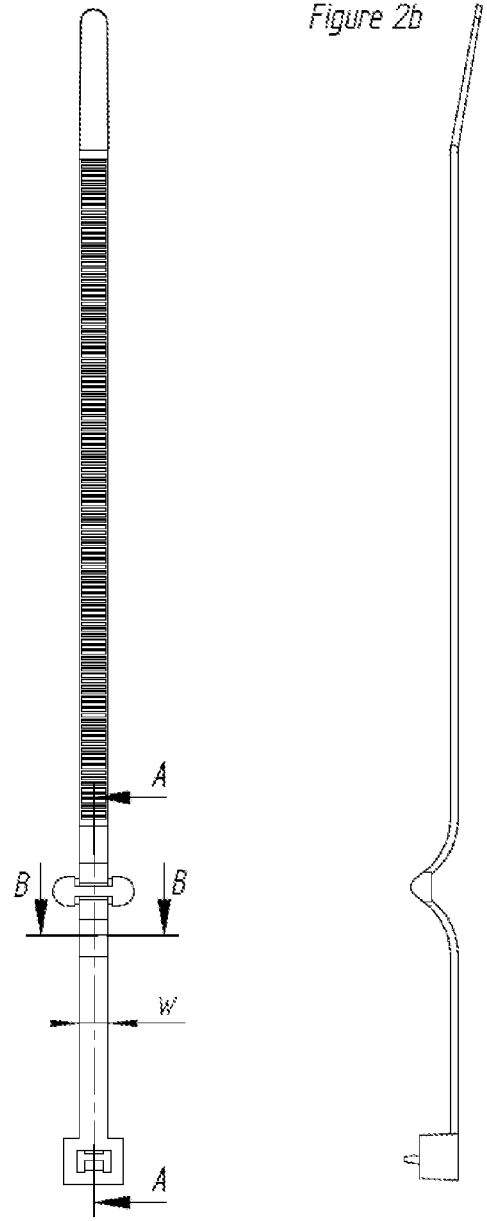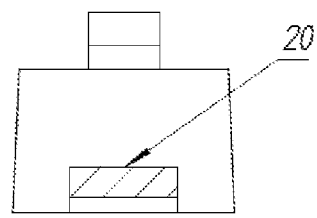

CABLE TIE FOR MOUNTING CABLES AGAINST A PANEL

PRIORITY

The present application is related to, and claims the priority benefit of, International Patent Application Ser. No. PCT/SE2013/050962, filed Aug. 10, 2013, which is related to, and claims the priority benefit of, Sweden Patent Application Ser. No. 1230082-8, filed Aug. 22, 2012. The contents of each of these applications are hereby incorporated by reference in their entirety into this disclosure.

This invention relates to a cable tie with the job to collect and hold one or more cables, tubes, hoses or similar against a panel. The cable tie is made of plastic, normally PA (Nylon). It consists of a band with means to form a loop. This description will focus mainly on a cable tie having one end with a ribbed side and in the other end there is a locking device with a hole that can receive the ribbed part and a locking mechanism inside locking the loop in a tightened position. The function of forming a loop could actually have any kind of mechanism since the claims of the invention is focused around mounting the cables towards the panel. The ends could actually just have holes that one can mount a Velcro band in. But the benefit of the type in the figures is that it is very robust and when it is tightened to engage the locking mechanism it will be even more robustly mounted to the panel as we shall see later. There are types with a release function integrated in the locking mechanism that can open up the loop and dismount the whole cable tie very easily. This also makes it suitable for the invention because one of the advantages of this invention is that it's easy to mount and easy to dismount from the panel. The cable tie is therefore a band of plastic with means to form a loop.

The cable tie has, on a specific place along its length a panel anchor for panel mounting that can be mounted into an opening in the panel. In the areas close to the panel anchor the band has a long and narrow cross-section. The panel anchor constitutes an elongated body that is integrated with the band. The panel anchors longitudinal axis is parallel with the cross-sectional long side of the band. The opening in the panel, aimed to receive the anchor, has a shape that is the sum of a circle and a long and narrow shape that are overlapping. The width of the long and narrow part (13) is smaller than the diameter of the circular part (12) but slightly bigger than the width (w) of the band and the length of the long and narrow part (13) is bigger than the diameter of the circular part (12) and slightly longer than the panel anchor (8). The cable tie changes direction at least one time close to or at the integration point (11) between the anchor and the band. The angle and radius of the curves are designed to facilitate the adaption to panels of different thicknesses. It is an advantage, as will be shown later, that the band on each side of the anchor has an outward tension after being mounted into the panel. It is probably best to change direction at least three times in order to keep a relatively straight overall shape of the entire cable tie.

This straight overall shape will be beneficial for the manufacturing processes, the molding tool cost and the handling process. It will be simpler to pack, store and use them. On each side of the anchor the band can have short sections where it is thinner, the reason for that is to control where the bends will occur and by that helping to adapt to different panel thicknesses. By making it thinner it bends easier and that reduces the stress in these areas.

PA, polyamide often used in cable ties have a tendency to break if the bending stress is high combined with a low humidity in the air. PA absorbs and releases water as the surrounding air humidity changes, so in the middle of the winter in the northern parts of Europe it might break when the bending forces are too tough. The indented fastening points (15) will also reduce stress and make the section that will bend close to the anchor a bit longer.

The direction of the long and narrow part of the opening shall be perpendicular to the directions of the cables, tubes or hoses to be mounted to the panel.

The mounting starts with a gentle bending of the two sides on each side of the anchor towards each other so that the anchor can be mounted into the hole without the cable tie touching the edges of the hole too much. First the anchor is mounted through the opening parallel with the elongated part of the opening until it is completely on the backside of panel. After that the cable tie is rotated 90° in any direction and then the bending is released. The curves of the band is now trying to restore the band to its original shape and by doing that the cable tie will be fixed into the two ends of the elongated part of the opening and thereby the band is blocked from further rotation. In this situation the cable tie is mounted quite loosely but still locked in all directions plus rotation. Then when it is tightened around a cable the whole area around the anchor is tightened, pushing the anchor against the backside of the panel, it is fixed. Since the 90° rotation can be chosen in any direction, the choice is made so that the making of the loop is easy, the side where the space is sufficient at that specific spot.

The distance between the locking mechanism and the anchor on the cable tie should not exceed the diameter of the smallest cable to be mounted. To make the fixation even more robust small extrusions from the anchor can extrude up in the circular part of the opening, shown in FIGS. 4a and 4b. The reason is to avoid movements of the cable when the panel is exposed to high vibrations. These extrusions can preferably be segments of a circle with a common diameter (d) slightly smaller than the round part of the opening. This enhances the fixation towards movement in the same plane as the panel. It also takes pressure of the thinner parts of the cable tie on each side of the anchor and avoid fatigue of these parts due to vibrations of the anchor along the panels backside.

As an example the panel thickness that one cable tie type can fit, might be in the range of 1.5-4 mm. And that covers most of the plates used when building cars, airplanes and machines that needs a lot of mounted cables. When the panel is thick it's an advantage with a chamfer on the openings front side edges, at least on the circular part. It might also be an advantage to make the opening slightly bigger when placed on a thicker panel. In that way the range that one single cable tie can fit will be increased. Another advantage with the panel anchor of this type is that it also can fit in openings on panels that are not flat.

Vaulted or curved plates, that are common in cars, airplanes and machines is not a problem, and it works for the same reason as it can handle different thicknesses.

The opening in the panel is preferably designed in a way that makes it possible to create it by drilling 3 holes, two small and then the one big in between. Punching is very effective, even the chamfer mentioned earlier can be made with the same punch. Milling is another alternative. It is possible to drill it by hand also if necessary with the help of a drilling fixture. A drilling fixture would help to place the small holes at a correct distance from each other, and then act as a guide when placing the big hole in between them.

This cable tie can also be used for marking cables, parts and details with numbers, text or symbols. Then all you need is a small plate with text or other information, the marking plate shall also contain the opening. Then the anchor is mounted to the marking plate opening before the cable tie is mounted and tightened around the detail to be marked. It is also possible to have two anchors on the same cable tie, one for the marking plate and one for mounting the cables against a panel.

The cable ties are easy to manufacture as molded parts, a simple tool with only two halves, and no need for any moving inserts in the tool. There might be some problems in handling the cable ties due to the geometry of the anchor witch gives them a tendency to hook up to each other. That also makes it a bit more difficult for the packaging. A solution might be to mold a number of them together with small bridges in between that are broken when removing one.

Since these products normally are produced in very high volumes it is preferred to mold a number of details in one tool anyway. They could stick together all the way to the end user. Yet another way could be to make some sort of holder or magazine in order to make it easier to pick one at the time, without hooking into a neighbor.

Even though one type can fit into different panel thicknesses, there will probably be a need for a number of variations, such as sizes, colors, an extra robust version, an extra big loop or a version with double anchors, mounting and marking. Anyway there's a big probability that one type is sufficient to do the cable attaching job in one machine.

STATE OF THE ART AND DESCRIPTION OF PROBLEMS TO BE SOLVED

Cable ties made of plastic, normally Nylon (PA), is a commonly used technique to mount things to each other. The big advantage is that they are very robust and the loop they create is very flexible in size in the way that one single cable tie can be used to fasten things of different sizes. But when fastening a bunch of cables against something, you normally do need to let the cable tie go around that something. When it is to be fastened against a panel or a plate, two holes can make it, if you enter in one and go back out through the other and then form the loop around the cables. One problem is that one does not always have access to the backside of the plate. In different kinds of machines it is normal that the cables are fastened against the chassis or similar where there is no access to the backside to enable you to enter one hole and go back in another. With the present invention and the specially shaped hole in the same chassis we can just enter the anchor part through the hole and rotate 90°, and then form the loop around the cable bunch.

One type of existing cable tie has a snap function in order to snap into a round or square hole, see for example Franks Patent WO2005/099402. These are mostly adapted for one particular panel thickness, but there are types that are designed to fit for two different thicknesses by having two snap functions at different depth. The type that snaps into a round hole doesn't have a locking function against rotation. Normally these are also difficult to dismount without having access to the backside of the panel since you normally have to squeeze the snap function together from the back in order to dismount it. There are cable ties that are dismountable from the front but then the snap function tends to grow so that the cable(s) no longer is close to the panel. When the cable is mounted offset from the panel the robustness against mechanical vibration declines significantly. Also, for reason of electromagnetic disturbances (EMC-problems) it is better to have the electrical cables clamped close to a metallic plate, it prevents the cable from becoming an antenna dipole that can send or receive electromagnetic noise.

Yet another type of panel mounting for cable ties is a so called tree-mounting type, it has a protruding mechanism that looks like a Christmas-tree with branches of decreasing length closer to the top. The mechanism is mounted into a round or square hole with the top first and its branches are deformed and the mechanism gets stuck.

This type is independent of the panel thickness and it can even fit into different sizes of holes but is not very robust against vibrations and can easily get loose if exposed to forces and vibrations. A somewhat similar type has a part of a plastic rivet integrated with the cable tie, it's a tube like protrusion that is split in two halves from the tip. The protrusion is mounted into the hole and then a plastic sprint is pushed into the tube protrusion forcing the two halves aside and making it expand on the backside of the panel. They are robust but consist of two parts and are therefore more expensive. When mounted, the bend is quite tough and puts a lot of stress to the split tube part and can cause it to break, especially in the winter when the humidity in the air is low. It works on one thickness only and also lacks protection against rotation.

There are also cable ties with one surface covered with adhesive to be attached to the plate, or a hole for screw mounting it towards the panel. They can either be integrated with the cable tie or a separate part with a small loop that the cable tie can be mounted through. The advantage with the adhesive type is that you don't have to make a hole in the panel but it is hard to find the balance between sticking to the plate and a possibility to remove it later on. With time adhesives also have a tendency to dry out and loose the adhesiveness, especially in a warm environment, as in many machines. The type with a screw is very robust but a threaded hole has to be made either directly in the panel if it is thick enough or by mounting a thread insert. The problem is that it takes time to both make the thread and then screwing it in place. To simply punch a hole, even if it is a little bit complex is very cheap and is made automatically.

To summarize, the existing cable ties often have one or more of the following drawbacks:
1. Difficult to mount to a panel without access to the backside of the panel.
2. Difficult to dismount from a panel without access to the backside of the panel.
3. Is only designed for one or two panel thicknesses
4. Protrudes too much from the panel.
5. Gives a bad EMC-immunity to the cables mounted.
6. Lack of locking against rotation of the cable tie.
7. Uses adhesive that dries out and loosens with time, and/or is hard to dismount.
8. Is not robust against strong vibrations.
9. Need threads, making the panel more expensive and takes more time to mount.
10. Is made of two parts with increasing costs.

The points above are also the problems that this invention claims to be the solution to.

The most important benefits with the invention are:
1. One type can handle many panel thicknesses.
2. Simple to mount.
3. Simple to dismount.
4. Very robust against strong vibrations.
5. Simple and cheap to manufacture.
6. Takes up very little space.
7. Does not protrude much on the backside.
8. Backside can be inaccessible both for mounting and dismounting.

9. Gives good EMC-immunity to electrical cables.
10. Can be mounted on panels that are not flat but vaulted or bent.

DESCRIPTION OF THE FIGURES

FIGS. 1a, 1b and 1c

Figure 3:
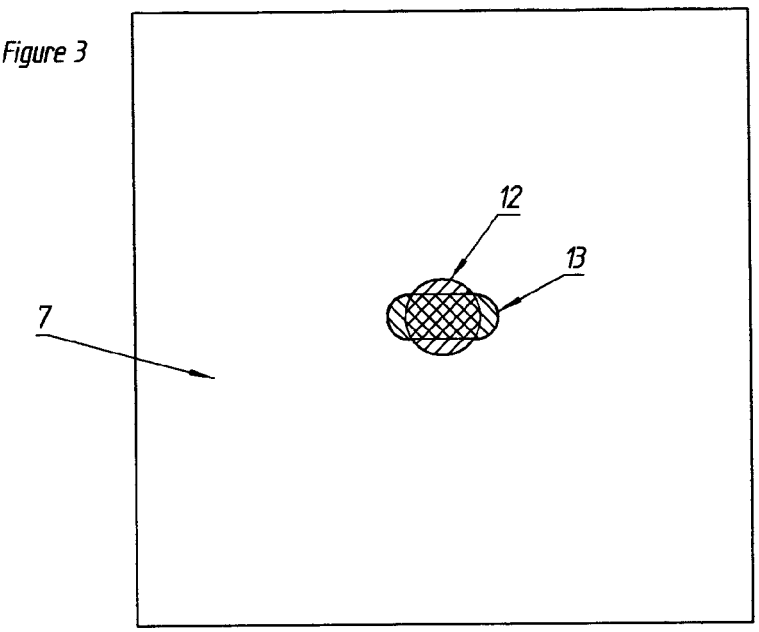
Figure 4A:
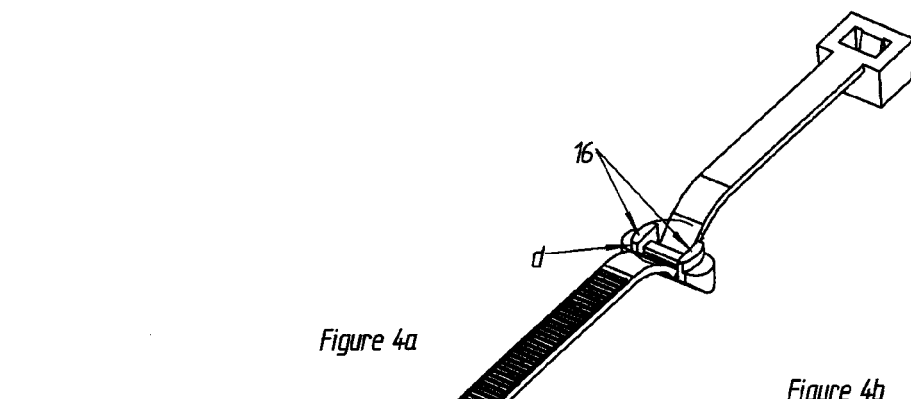
Figure 4B:
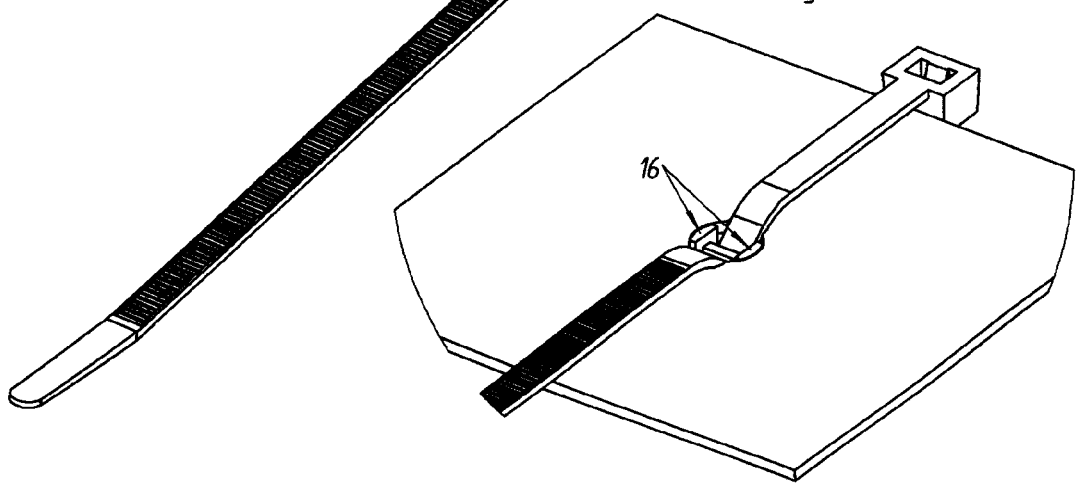
Figure 5:
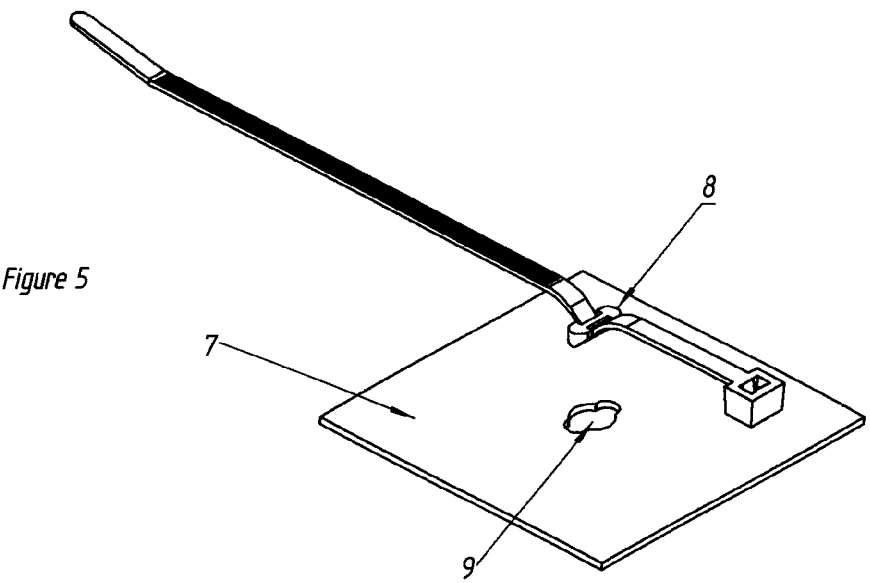
Figure 6:
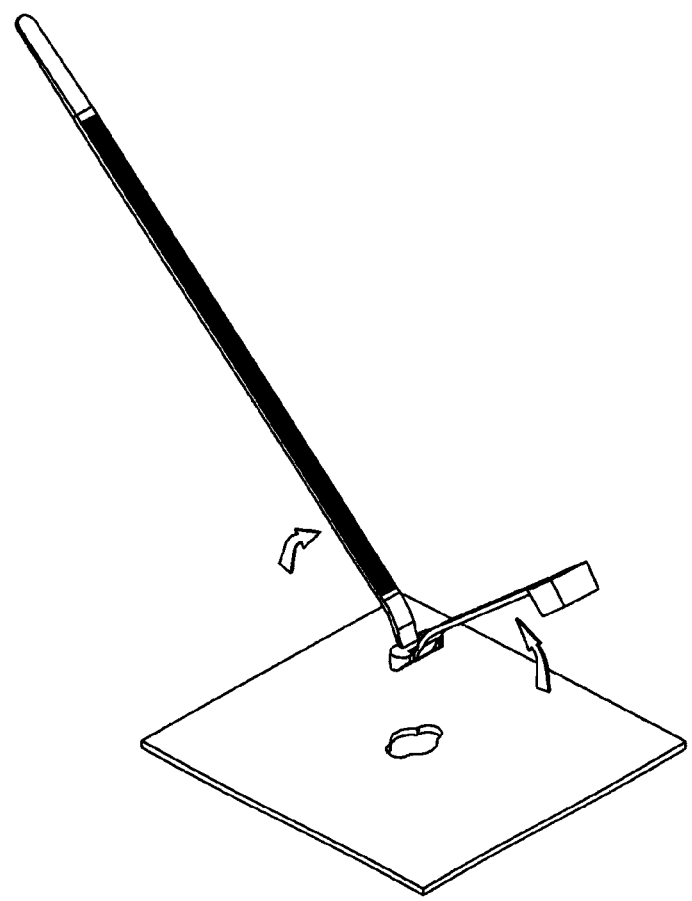
Figure 7:
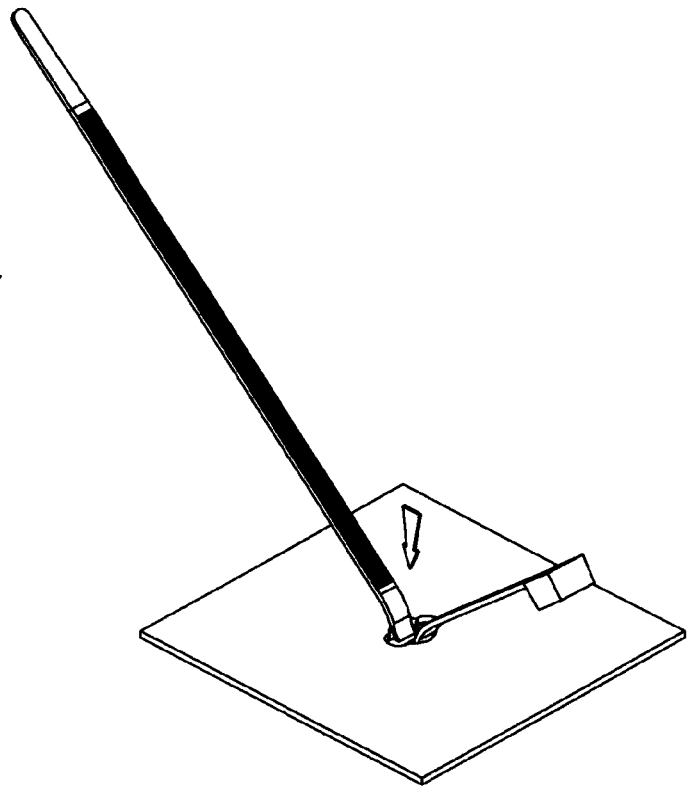
Figure 8:
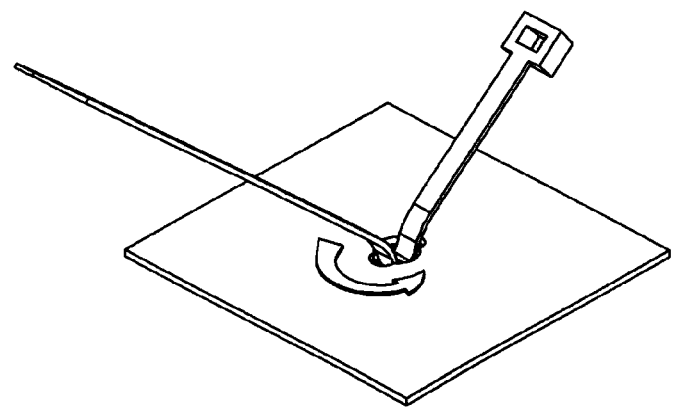
Figure 9:
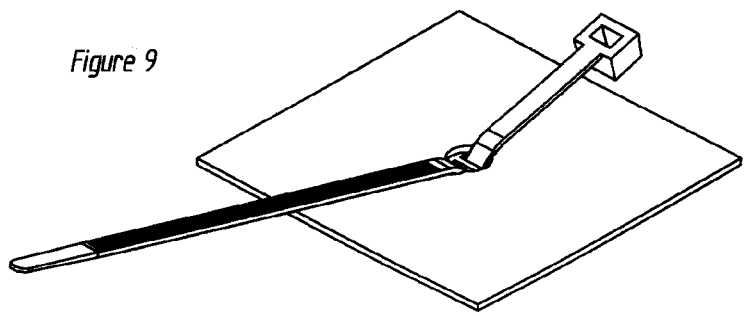
Figure 10:
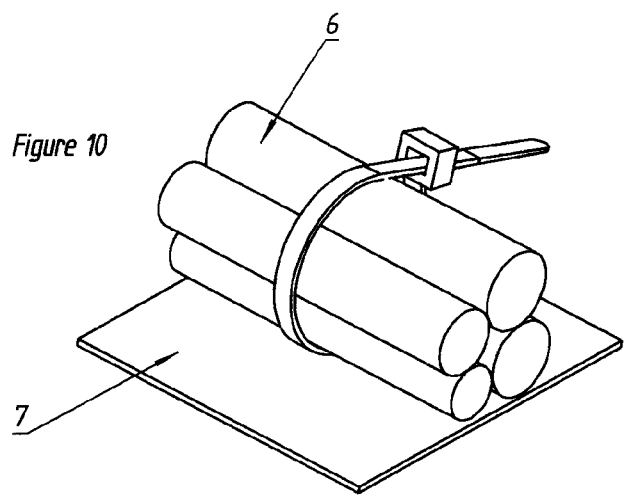
Figure 11:
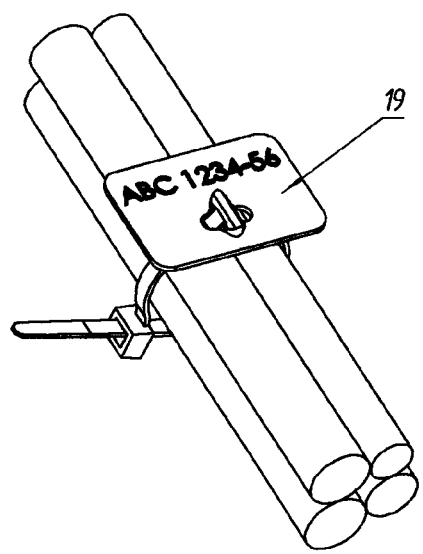

Shows a cable tie (1) with a panel anchor (8) and example of means (17,18) forming a loop (5) in different perspectives

FIG. 2a

Shows a main view of the cable tie (1) with associated section view A-A and example of details (2,3,4) for forming a loop (5) and direction changes (10,10') and at point (11), also section B-B showing the cross section of the band and its long side (20) in the vicinity of the panel anchor (8).

FIG. 2b

Shows a projected view from FIG. 2a

FIG. 3

Shows the design of the opening (9) in the panel (7), with a long and narrow part (13) and a circular part (12)

FIG. 4a

Shows an alternative panel anchor (8) with extruded segments of a circle (16)

FIG. 4b

Shows an alternative panel anchor (8) with extruded segments of a circle (16) mounted in a panel (7)

FIG. 5

Shows the cable tie (1) with panel (7) before mounting

FIG. 6

Shows the gentle bending of the cable tie prior to mounting

FIG. 7

Shows how the panel anchor (8) is inserted into the panel (7)

FIG. 8

Shows how the cable tie (1) is rotated 90° in the opening (9)

FIG. 9

Shows the cable tie after recovering from the initial bend

FIG. 10

Shows how the cable tie have formed a loop (5) around four cables (6) that have been mounted against the panel (7)

FIG. 11

Shows marking of cables with the use of a marking badge (19)

The invention claimed is:

1. A cable tie with means to form a loop, said cable tie is intended to attach cables or similar details against a panel with use of an integrated panel anchor, said panel anchor is mounted into an opening in said panel, the cable tie is characterized by;
   a, having an elongated band in a vicinity of the panel anchor and;
   b, the panel anchor having a long and narrow body with its longitudinal axis perpendicular to, or at least not parallel with, the elongated band and;
   c, that portions of the cable tie proximal and distal to the panel anchor are configured to change direction in, and/or in a vicinity of a point where the panel anchor is integrated with the cable tie and;
   d, the panel anchor intended to be mounted into a panel opening having a shape that is a combination of a long and narrow opening which is longer than the panel anchor and a circle with a diameter that is smaller than a length of the panel anchor and;
   e, that said panel anchor is intended to be mounted in and completely through the long and narrow opening while said portions of the cable tie proximal and distal to the panel anchor are gently bent toward each other and that the cable tie thereafter is rotated around the axis of a circular part of the opening so that a top-side of utmost parts of the panel anchor thereby is locked towards a back-side of the panel and the band on each side of the panel anchor is locked against further rotation on a front-side when said portions of said cable tie proximal and distal to the panel anchor are released so to restore the cable tie to its original shape and at least part of said portions of said cable tie proximal and distal to the panel anchor are positioned in both ends of the long and narrow part of the opening; and
   wherein an integration point between the cable tie and the panel anchor is indented into the panel anchor.

2. A cable tie according to claim 1 that is intended to be mounted in panels of different thicknesses in that it has curves in a vicinity of the panel anchor.

3. A cable tie according to claim 1 with thinner sections on both sides of the panel anchor.

4. A cable tie according to claim 1 with segments of a circle extruded from an elongated body of said panel anchor and with a common diameter being slightly smaller than a diameter of the circular part of the opening.

5. A cable tie according to claim 1 where parts of the band have at least one of its two flattened surfaces ribbed.

6. A cable tie as in claim 5 with a locking device in one of its ends consisting of a hole aimed to receive at least part of the ribbed band therein and completely therethrough and thus creating a loop and where a locking mechanism locks the loop in a tightened position.

7. A cable tie as in claim 6 with a release mechanism to release the locking mechanism and by that opening up the loop.

8. The cable tie according to claim 6 whereby rotation of said panel anchor relative to said panel and tightening said band around said cables or similar details by positioning the first end of said band in and completely through said locking mechanism further locks and further tightens said panel anchor against said panel.

9. A cable tie according to claim 1 where the panel is replaced with a marking badge.

10. A cable tie, comprising:
   an elongated and generally planar band comprising means to form a loop;
   a panel anchor defined within the band, the panel anchor having a long and narrow body configured to fit completely within a corresponding elongated part of an aperture defined within a panel;
   wherein portions of the band proximal and distal to the panel anchor are configured to change direction in, and/or in a vicinity of a point where the panel anchor is defined within the band and
   wherein when the long and narrow body is positioned within the elongated part of the aperture while said portions of the band proximal and distal to the panel anchor are gently bent toward each other, rotation of the band causes the band to be secured within the aperture when said portions of said band proximal and distal to the panel anchor are released so to restore the band to its original shape and so that said portions of said band proximal and distal to the panel anchor are partially positioned within the elongated part of the aperture; and
   wherein the band forms an indented portion at the panel anchor.

11. The cable tie of claim 10, wherein the means to form the loop can form the loop so that one or more cables are secured within the loop.

12. The cable tie of claim 10, wherein rotation of the band 90° causes the band to be secured within the aperture.

13. The cable tie of claim 10, wherein when the long and narrow body is positioned within the elongated part of the aperture, the long and narrow body is located at a relative back of the panel, and wherein the means to form the loop is/are located at a relative front of the panel.

14. The cable tie of claim 10, wherein a portion of the band comprises a ribbed surface, and wherein the means to form the loop comprises a locking mechanism defining a hole therein and a release mechanism adjacent to the hole.

15. A cable tie according to claim 10 with thinner sections on both sides of the panel anchor.

16. A cable tie according to claim 10 where an integration point between the cable tie and the panel anchor is indented into the panel anchor.

17. A system, comprising:
   a panel defining an aperture therein, the aperture having an elongated part; and
   a cable tie, comprising:
      an elongated and generally planar band comprising means to form a loop comprising a locking mechanism at or near a first end of the band defining a hole therein configured to receive a second end of the band therein and completely therethrough and a release mechanism adjacent to the hole;
      a panel anchor defined within the band, the panel anchor having a long and narrow body configured to fit completely within a corresponding elongated part of an aperture defined within a panel;
      wherein portions of the band proximal and distal to the panel anchor are configured to change direction in, and/or in a vicinity of a point where the panel anchor is defined within the band and
   wherein when the long and narrow body is positioned within the elongated part of the aperture while said portions of the band proximal and distal to the panel anchor are gently bent toward each other, rotation of the band causes the band to be secured within the aperture when said portions of said band proximal and distal to the panel anchor are released so to restore the band to its original shape and so that said portions of said band proximal and distal to the panel anchor are partially positioned within the elongated part of the aperture.

18. The system of claim 17, wherein the aperture of the panel further has a circular part, the circular part configured so that a portion of the cable tie at or near the panel anchor fits within the circular part and so that the portion of the cable tie at or near the panel anchor can rotate within the circular part of the aperture.

19. The system of claim 17, wherein the means to form the loop can form the loop so that one or more objects can be secured within the loop while the cable tie is secured within the aperture of the panel.

20. A system according to claim 17 where parts of the band have at least one of its two flattened surfaces ribbed.

* * * * *